Figure 1:
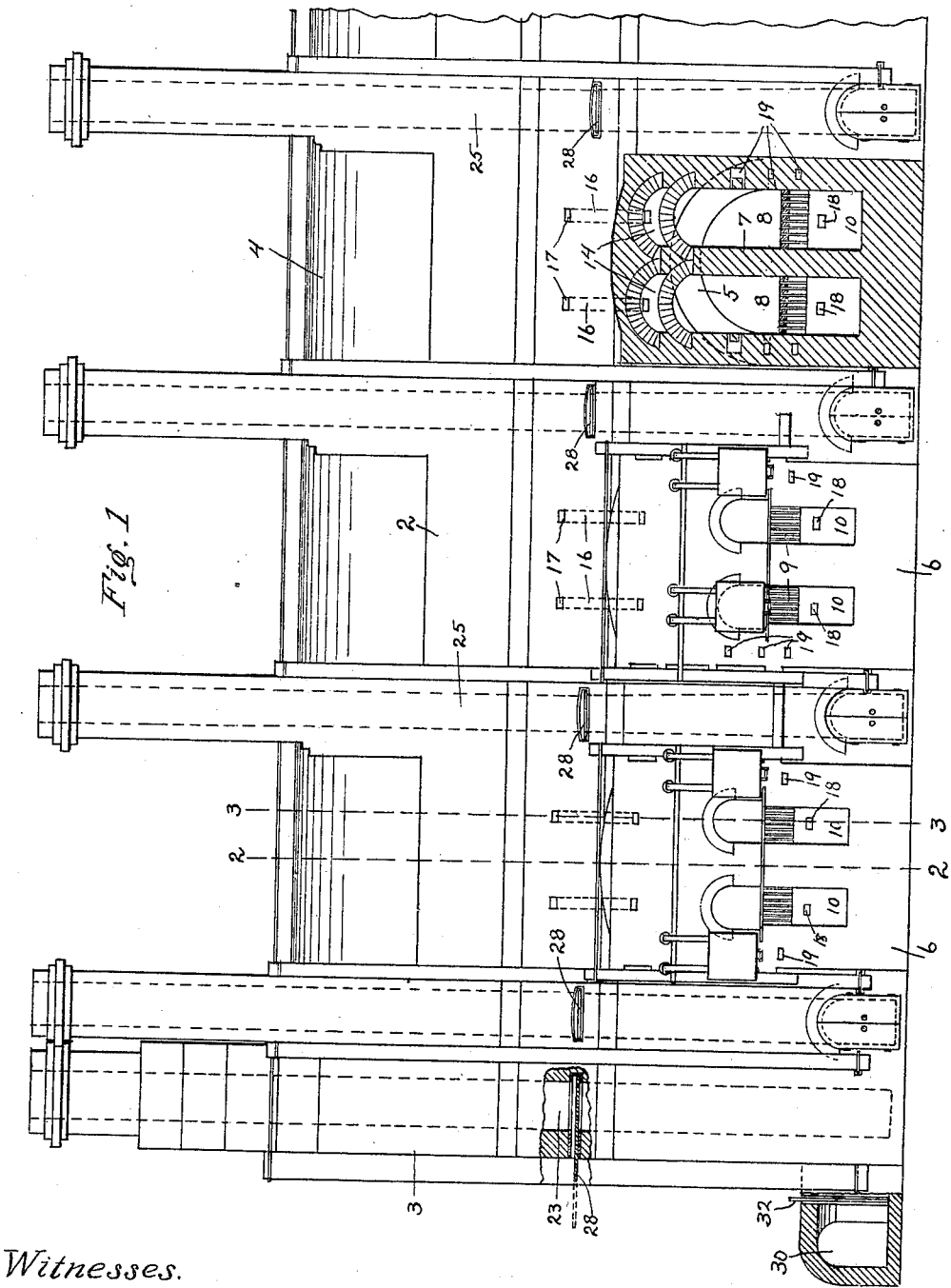

No. 704,418. Patented July 8, 1902.
T. M. WILSON.
BRICK KILN.
(Application filed Oct. 26, 1901.)
(No Model.) 6 Sheets—Sheet 1.

Witnesses.
Fred D Sweet.
Alex. D. Mabou.

Inventor.
Thomas M. Wilson,
By J. McNabb
Attorney.

No. 704,418. Patented July 8, 1902.
T. M. WILSON.
BRICK KILN.
(Application filed Oct. 26, 1901.)
(No Model.) 6 Sheets—Sheet 2.

No. 704,418.
T. M. WILSON.
BRICK KILN.
(Application filed Oct. 26, 1901.)
Patented July 8, 1902.
(No Model.)
6 Sheets—Sheet 3.
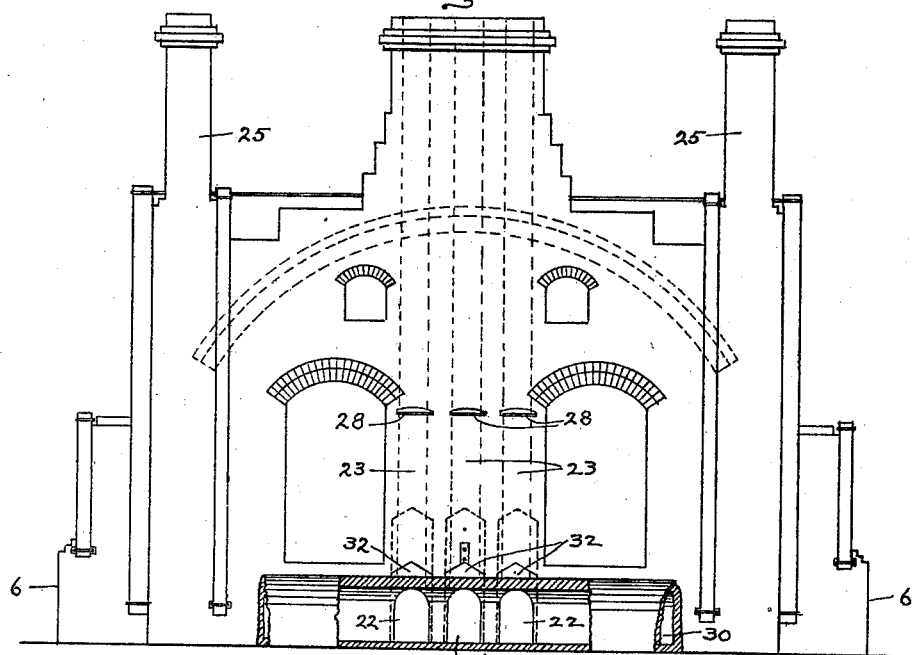
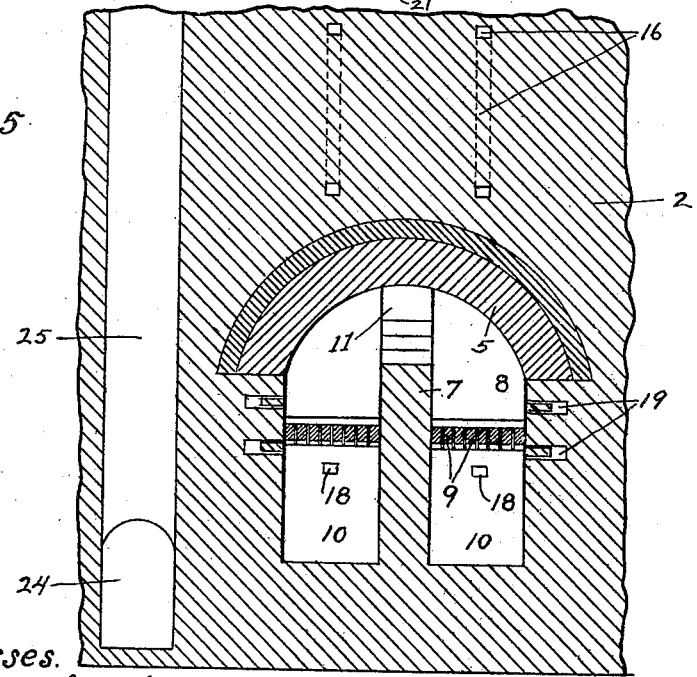
Witnesses.
Fred D. Sweet.
Alex. D. Malor
Inventor.
Thomas M. Wilson,
By Jno. M. Nesbit
Attorney.

No. 704,418. Patented July 8, 1902.
T. M. WILSON.
BRICK KILN.
(Application filed Oct. 26, 1901.)
(No Model.) 6 Sheets—Sheet 4.
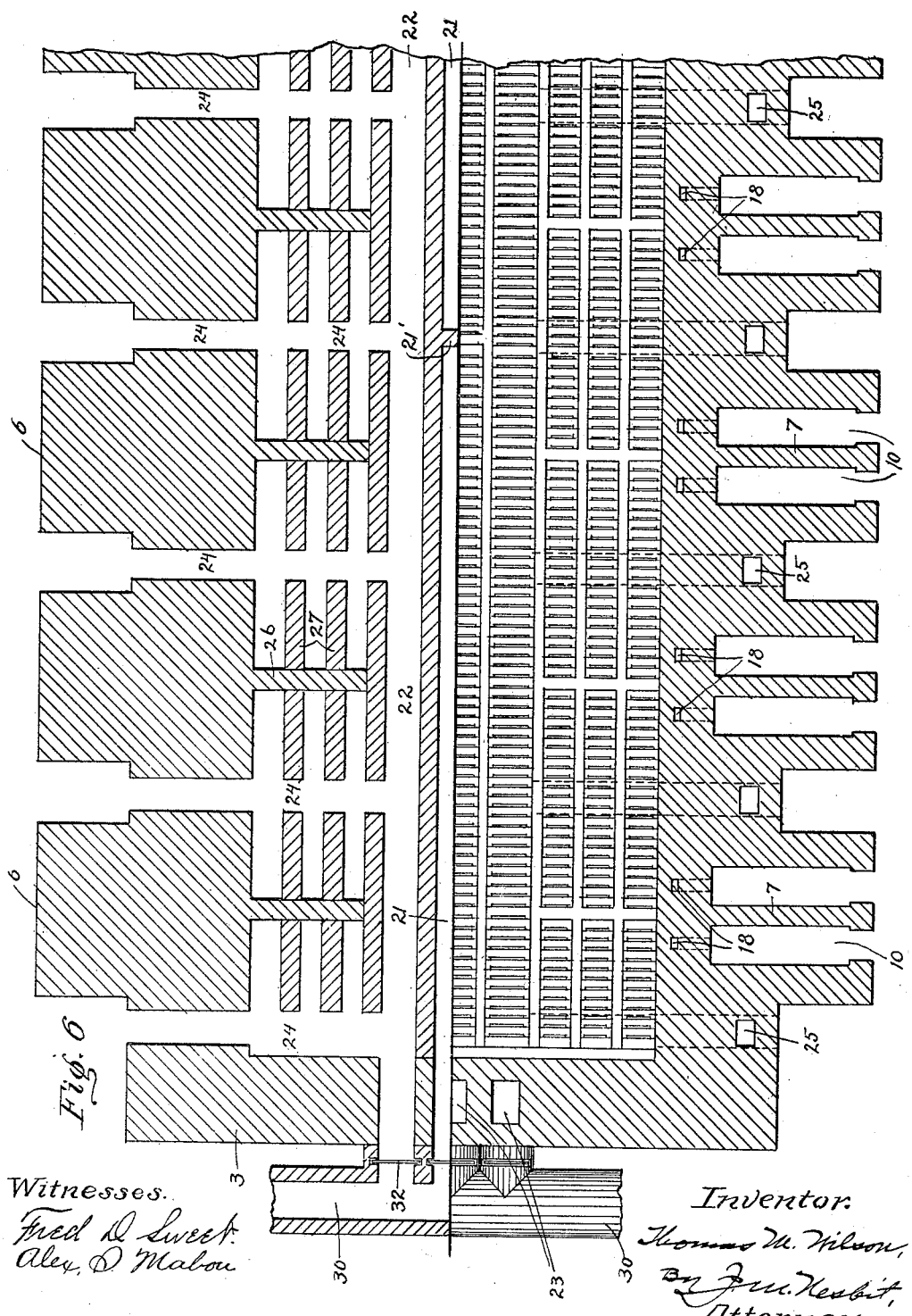

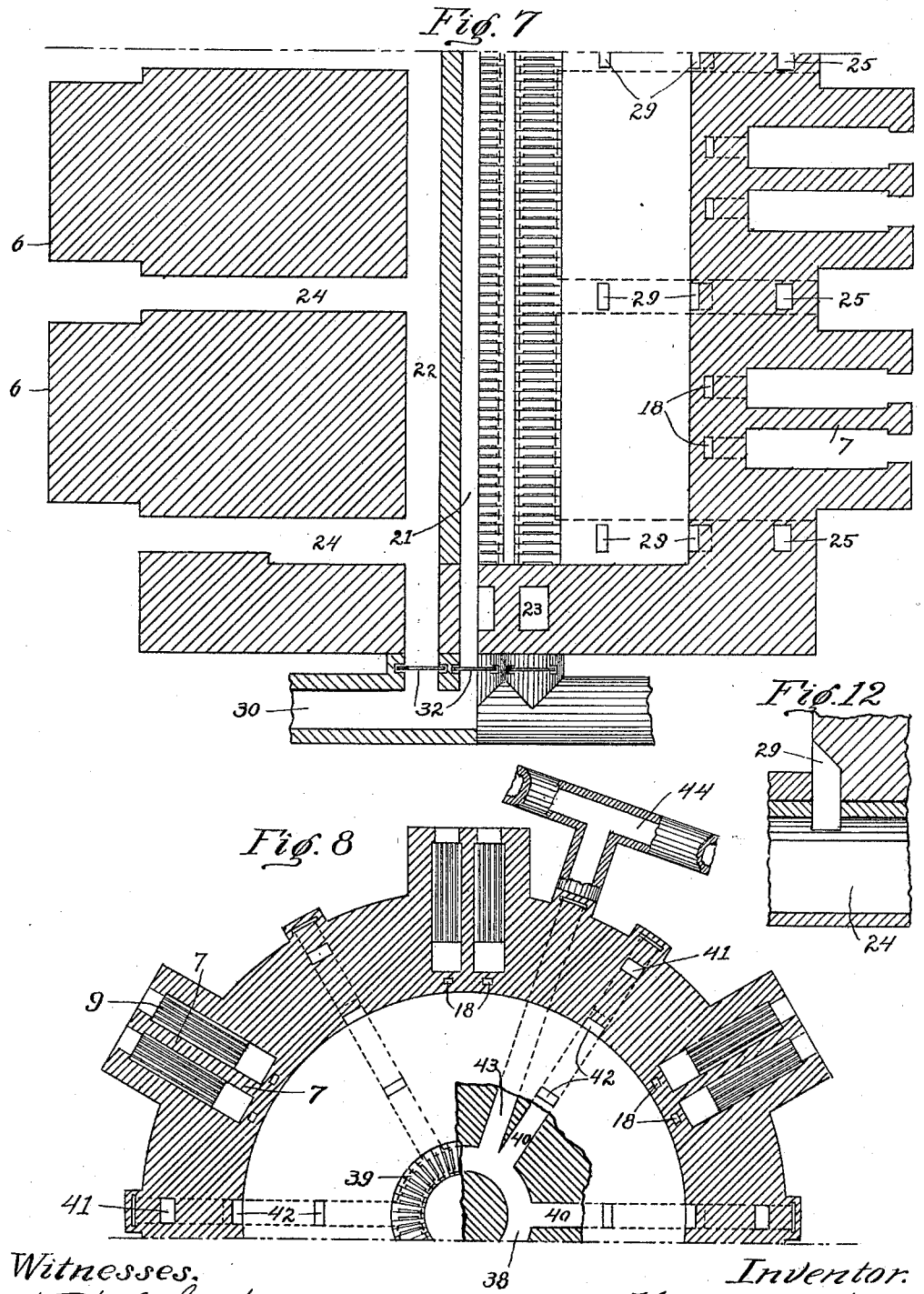

No. 704,418. Patented July 8, 1902.
T. M. WILSON.
BRICK KILN.
(Application filed Oct. 26, 1901.)
(No Model.)
6 Sheets—Sheet 6.

Witnesses.
Fred D. Sweet
Alex. D. Mabon

Inventor:
Thomas M. Wilson
by J. M. Nesbit,
Attorney.

UNITED STATES PATENT OFFICE.

THOMAS M. WILSON, OF LAYTON, PENNSYLVANIA.

BRICK-KILN.

SPECIFICATION forming part of Letters Patent No. 704,418, dated July 8, 1902.

Application filed October 26, 1901. Serial No. 80,089. (No model.)

*To all whom it may concern:*

Be it known that I, THOMAS M. WILSON, a citizen of the United States, residing at Layton, in the county of Fayette and State of Pennsylvania, have invented certain new and useful Improvements in Brick-Kilns, of which the following is a specification, reference being had therein to the accompanying drawings.

This invention pertains to brick-kilns; and one object thereof is to provide a double or two-part furnace of improved construction possessing advantages hereinafter pointed out in addition to utilizing the furnace division-wall as a lateral brace or support for the arched furnace-opening in the main wall of the kiln.

A further object of the invention is to so construct and arrange the kiln-floor, the flues beneath the floor, and the chimneys that by means of suitable dampers the heat may be evenly distributed throughout the kiln or concentrated in one or more portions thereof, as may be required in effecting an even or uniform burning of the brick.

A further object of the improved floor construction is to so arrange the flues that the heat may be readily withdrawn from a burned kiln.

A further object of the invention is to construct and connect a series of kilns in such manner that heat may be withdrawn from any one kiln and discharged into any one or more of the other kilns, thus facilitating cooling of the burned brick and utilizing the heat heretofore wasted for water-smoking the brick in the kiln or kilns into which it is forced. The heat thus withdrawn from a burned kiln may also be discharged into a drier, thereby economizing the fuel consumption of the latter.

The invention consists in the novel features of construction and in the combination and arrangement of parts hereinafter fully described and claimed, and illustrated by the accompanying drawings, wherein—

Figure 2:
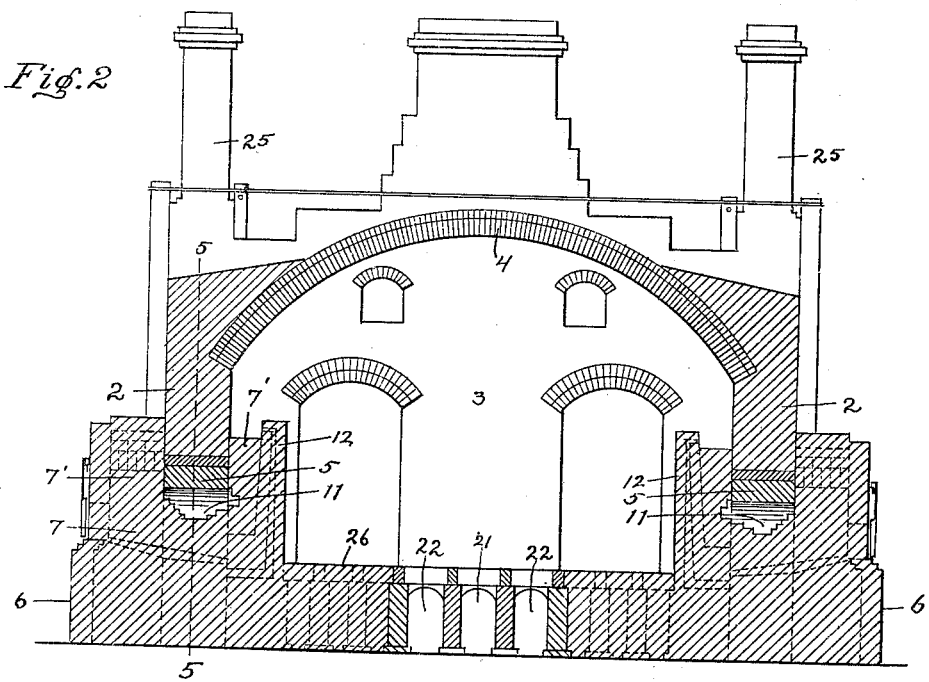
Figure 3:
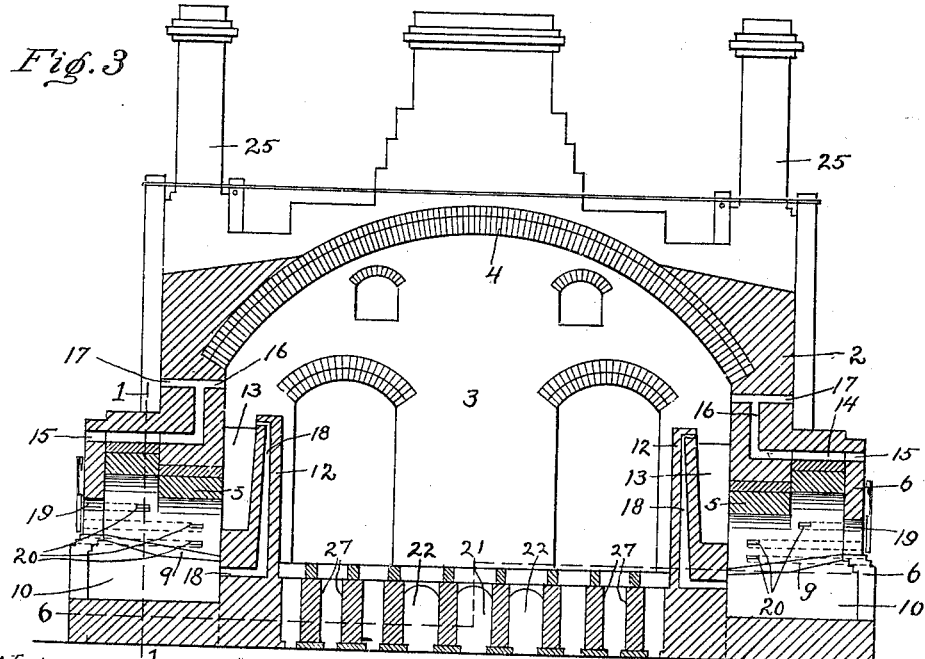
Figure 9:
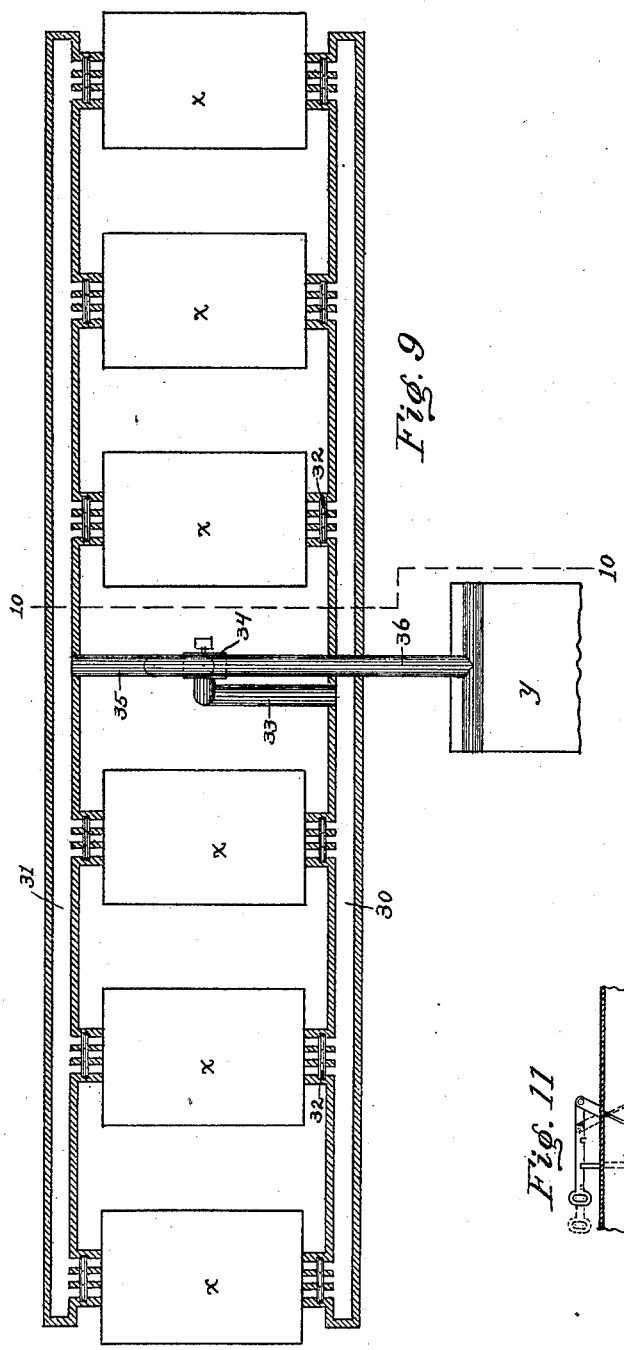
Figure 10:
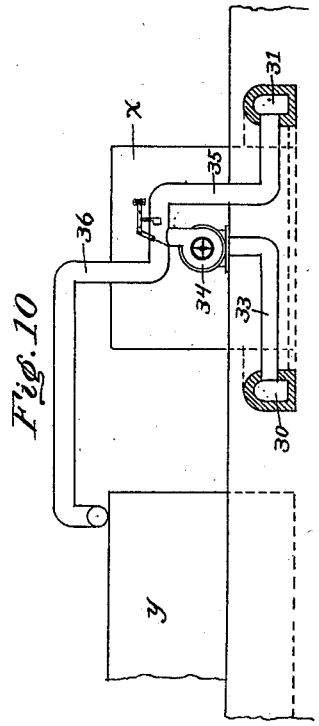
Figure 11:
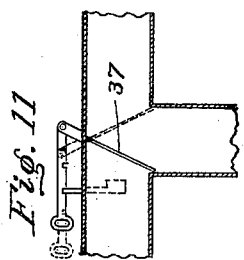

Figure 1 is a side elevation of a portion of a kiln constructed in accordance with my invention, one of the furnaces being shown in section, taken on line 1 1 of Fig. 3. Figs. 2 and 3 are cross-sectional views of the kiln, taken on lines 2 2 and 3 3, respectively, of Fig. 1. Fig. 4 is an end elevation. Fig. 5 is a vertical longitudinal sectional view of the main kiln-wall, taken on line 5 5 of Fig. 2. Fig. 6 is a sectional plan view taken on the broken line 6 6 of Fig. 3, thereby showing one half of the kiln in ground plan and the other half in floor plan. Fig. 7 is a view similar to Fig. 6, illustrating a floor of slightly-modified construction. Fig. 8 is a sectional plan view of a portion of a circular kiln embodying my invention. Fig. 9 is a diagrammatic view of a series of kilns and a drier connected in accordance with my invention. Fig. 10 is a cross-sectional view on line 10 10 of Fig. 9. Fig. 11 is a detailed view of the damper adjacent the fan. Fig. 12 is a sectional detail view illustrating flue-opening 29.

In the preferred embodiment of my invention the kiln is of rectangular form, 2 indicating the longitudinal side walls thereof, 3 the end walls, and 4 the crown. Formed at suitable intervals in the side walls are furnace-openings, and spanning each of these openings is an arch 5. Projecting outwardly from each of these openings and completely inclosing the same is a double furnace structure 6, which is centrally divided by vertical partition-wall 7 to form the furnace-compartments 8. A grate 9 is provided for each furnace, and beneath same is ash-pit 10. By referring to Figs. 2 and 5 it will be seen that division-wall 7 is constructed with a transverse opening 11, located, preferably, beneath arch 5. Wall 7 is extended vertically on opposite sides of arch 5 and the kiln-wall, as indicated at 7', thereby constituting a lateral brace or support and preventing the arch from buckling or crowding laterally in either direction under the intense heat to which it is subjected. I deem this a most important feature of my invention, as thereby the kiln-walls and furnace-opening arches are permanently preserved, whereas prior to my invention it was necessary to frequently repair and rebuild these portions of the kiln. The inner portion of each division-wall 7 intercepts the vertical bag-wall 12, extending from end to end of the kiln, thereby forming a separate combustion-chamber 13 between the bag-wall and kiln-wall 2 for each furnace-compartment 8. With the upper portions of the furnace-compartments communicating through opening 11 the furnaces when both are fired burn practically as a single furnace. However, by means of this arrangement the fire may be withdrawn from either of the furnaces and the grate cleaned without interfering with or interrupting the continuity of the burning process. The cleaned furnace may be quickly fired and brought to the required degree of heat owing to its communication with the adjacent burning furnace, this being accomplished much more quickly than is possible with a single furnace. Also by means of this double-furnace arrangement one furnace only of each pair may be utilized for heating the kiln in a preliminary way or for water-smoking the brick, and then at the proper time the generation of heat may be quickly increased to the full capacity of the furnaces.

The crown of each of furnace-compartments 8 is preferably of double arch construction, as shown in Fig. 1, to form air-space 14, which is utilized for the double purpose of protecting that portion of the structure against the intense heat and for heating the air which is admitted thereto through ports 15 and issues therefrom through duct 16 to the interior of the kiln. Each of ducts 16 may have a horizontal branch 17 opening through the outer face of the kiln for the purpose of drawing air from the exterior and also to form a peep-hole for inspecting the brick while burning. Duct 16 enters the kiln immediately over combustion-chamber 13, and the heated air issuing therefrom unites with air discharging through the inner face of bag-wall 12 from duct 18, thereby accelerating and rendering more perfect the combustion of the ignited gases rising from chamber 13. Duct 18 extends downwardly through the bag-wall and opens through the rear wall of ash-pit 10, at which point the air enters. The vertical outer wall of each furnace is preferably formed with three or more horizontal ducts 19, extending inward from the front face of the furnace and opening into the furnace-compartment at 20, thereby accelerating combustion and protecting and preserving the said walls.

I will now describe the perforated kiln-floor with its several flues and chimney connections.

Extending longitudinally through the center of the kiln is flue 21, having unbroken side walls and divided at the center of the kiln by partition 21'. On either side of flue 21 is a longitudinal flue 22 also extending from end to end of the kiln, said flues 21 and 22 passing through the end walls 3 and communicating with chimneys 23 formed therein. Intersecting each of flues 22 are the transverse flues 24, extending through the side walls 2 and communicating with chimneys 25 formed therein. In the embodiment of the invention shown in Fig. 6 the ground plan is shown constructed with the transverse walls 26 extending between flues 22 and the foundation of the bag-wall, with cords 27 extending from these walls to transverse flues 24, whereby the entire floor of the kiln may be open or perforated and at the same time formed into separate compartments beneath the floor, each of the compartments referred to being closed at the ends by walls 26. Each of the chimneys 23 and 25 is provided with a suitable slide or other damper 28, whereby they may be readily opened or closed by the operator. With all of the furnaces burning and with all of the chimney-dampers open the heat under ordinary conditions will be evenly distributed throughout the kiln, as the chimney connections create an even or uniform downdraft through all parts of the perforated floor. Upon the discovery of "cold spots" or other indications of uneven distribution of heat the heat of the entire kiln or of any desired portion thereof may be directed to the affected place by closing all of the chimney-dampers save the one or more immediately contiguous to the point at which it is desired to concentrate the heat. Thus, if a cold spot should appear near the bag-wall the dampers of the end-wall chimneys 23 would be closed, also the dampers of all of the side-wall chimneys 25 save the one or more nearest the cold spot, and thus with the draft shut off excepting through the one or two open chimneys it will be seen that the entire draft of the furnace will be directed through the open flues and the heat thus concentrated at the point desired. In like manner the heat may be concentrated at the center of the kiln by closing the dampers of all the side chimneys. With partition 21' midway the ends of central flue 21 it will be understood also that the heat may be concentrated in the center of the kiln and at either end desired by closing all of the chimney-dampers save the damper of chimney 23 at either one end or the other of said flue 21.

Instead of having the entire area of the floor perforated it may be constructed with perforations only over flues 21 and 22, as shown in Fig. 7, in which case walls 26 and cords 27, Fig. 6, are omitted, the floor and foundation being solid between adjacent flues 24 and inward to flue 22. In such construction flues 24 are each formed with two or more openings 29, extending upward through the kiln-floor. One of these openings is preferably arranged in a recess formed in the bag-wall, whereby refuse is prevented from dropping into and clogging the flue. One protected opening of this kind may be sufficient for each of flues 24, though, as above stated, two or more openings may be provided, if desired.

Longitudinal flues 21 and 22 extend outwardly from the kiln and at the front end of the latter communicate with flue 30 and at the rear end with flue 31. By referring to Fig. 9 it will be seen that these flues 30 and 31 are thus connected to a series of kilns X, dampers 32 being interposed therebetween, whereby communication may be established with any one or more kilns. In the preferred embodiment of the invention flue 30 is connected by pipe 33 with a fan or blower 34, and the discharge of the fan is connected by pipe 35 with flue 31 and also by pipe 36 with a drier Y. A damper or cut-off 37 is arranged in the fan-discharge between pipes 35 and 36, whereby the heated air drawn from flue 30 may be forced into flue 31 or into the drier at the option of the operator. By means of this arrangement it will be seen that the fan will operate to draw heated air from any one of kilns X, and the heat thus withdrawn from the burned kiln may be discharged into flue 31, and from thence enter any one of the kilns in communication with said flue for the purpose of water-smoking brick set therein, or the heat may be diverted to and absorbed by the drier. With flues 21 and 22 and 24, arranged as shown, heated air may be drawn downward into the flues uniformly from all portions of the kiln, and, reversely, heated air may be forced uniformly into all portions of the kiln.

In Fig. 8 I show a portion of a circular kiln provided with my improved two-compartment furnaces, also the solid bottom construction characteristic of the construction shown in Fig. 7. In the circular kiln a central circular flue 38 is provided, covered with perforated tile 39. This flue 38 corresponds with one of the flues 22 of the rectangular kiln, and radiating therefrom are flues 40, extending to dampered chimneys 41. Extending upward from these flues through the floors are openings 42, corresponding to openings 29, Fig. 7. Thus it will be seen that by properly manipulating the dampered chimneys 41 heat may be concentrated in any desired portion of the kiln. Communicating with circular flue 38 is flue 43, which extends to an outside conduit 44, and with a fan connected with the latter heated air may be withdrawn from or forced into the circular kiln, as described of the rectangular kilns.

Having thus fully described my invention, what I claim as new, and desire to secure by Letters Patent, is—

1. The combination of a kiln, furnaces immediately adjacent each other communicating with the kiln, and a transversely open partition-wall separating the furnaces.

2. The combination of a kiln having a furnace-opening, a furnace structure inclosing the opening and containing two immediately adjacent furnaces, and a transversely open partition-wall separating the furnaces.

3. The combination of a kiln having an opening in its wall, two adjacent furnaces communicating with the kiln through said opening, and a partition separating said furnaces and intersecting the kiln-wall above the opening.

4. The combination of a kiln having an opening in its wall, two adjacent furnaces communicating with the kiln through said opening, and a vertical partition separating the furnaces, the partition extending through the kiln-opening and above the same, thereby laterally bracing the kiln-wall above the opening.

5. The combination of a kiln having an opening in its wall, two adjacent furnaces communicating with the kiln through said opening, and a vertical partition separating the furnaces, the partition having a transverse opening through which the furnaces communicate, said partition extending through the kiln-opening and above the same on the inner and outer sides of the kiln-wall, thereby laterally bracing the same.

6. The combination of a kiln having an opening, a furnace structure inclosing the opening and a portion of the kiln-wall adjacent the opening, and a lateral reinforcement within the furnace structure for the said inclosed portion of the wall.

7. The combination of a kiln having an opening, a furnace communicating with the kiln through the opening, and a transverse wall intersecting the kiln-wall immediately above the said opening and laterally bracing the same.

8. The combination of a kiln having an opening, a furnace structure without the kiln and inclosing the opening and communicating with the kiln through the opening, and a lateral reinforcement within the furnace for the portion of the kiln-wall immediately over said opening.

9. The combination of a kiln having an open floor, flues extending inward from the outer wall of the kiln and into which the floor opens, a dampered chimney connection for each flue, an additional flue communicating with each of the inwardly-extending flues, and means for inducing a draft in said additional flue.

10. The combination of a kiln having an open floor, flues extending inward from the outer wall of the kiln and into which the floor opens, an additional flue communicating with each of the inwardly-extending flues, and a separate dampered chimney connection for each of said flues.

11. The combination of a kiln having an open floor, flues extending inward from the outer wall of the kiln and into which the floor opens, a dampered chimney connection for each of said flues, an additional flue communicating with each of the inwardly-extending flues, and means adapted to be connected to said additional flue for either drawing air therefrom or forcing air thereinto.

12. The combination of a kiln having an open floor, two separated flues extending longitudinally of the floor adjacent the center thereof, transverse flues communicating at their inner ends with said longitudinal flues, and separate dampered chimney connections for said longitudinal and transverse flues.

13. The combination of a kiln having an open floor, three separate flues extending longitudinally of the kiln-center, dampered chimneys for opposite ends of said flues in the end walls of the kiln, transverse flues extending inward from the side walls of the kiln and communicating with the outer two of said longitudinal flues, and dampered chimneys in the side walls of the kiln for the said transverse flues.

14. The combination of a series of kilns, two flues—each having a separate dampered connection with each kiln, and means interposed between and connecting said flues for drawing air from one flue and forcing it into the other flue.

15. The combination of a series of kilns, flues beneath the kiln-floors into which the latter open, and flues at opposite ends of and common to all the kilns and having dampered connection with each kiln through the said underfloor flues.

16. The combination of a series of kilns, two flues each having dampered connection with each kiln, air drawing and forcing mechanism connected to and adapted to draw air from one of said flues, a drier, and a dampered connection between said mechanism, the other of said flues, and the drier, whereby air may be drawn from any one kiln and forced into any other kiln or into the drier.

In testimony whereof I affix my signature in presence of two witnesses.

THOMAS M. WILSON.

Witnesses:
J. M. NESBIT,
ALEX. S. MABON.